United States Patent
Roskind et al.

(10) Patent No.: US 9,843,526 B2
(45) Date of Patent: Dec. 12, 2017

(54) PACING ENHANCED PACKET FORWARDING/SWITCHING AND CONGESTION AVOIDANCE

(71) Applicant: Google Inc., Mountain View, CA (US)

(72) Inventors: James Anthony Roskind, Redwood City, CA (US); Ryan Hamilton, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/097,242

(22) Filed: Apr. 12, 2016

(65) Prior Publication Data
US 2016/0226783 A1 Aug. 4, 2016

Related U.S. Application Data

(63) Continuation of application No. 14/053,413, filed on Oct. 14, 2013, now Pat. No. 9,319,329.

(51) Int. Cl.
*H04L 12/823* (2013.01)
*H04L 12/825* (2013.01)
*H04L 12/801* (2013.01)

(52) U.S. Cl.
CPC .............. *H04L 47/32* (2013.01); *H04L 47/11* (2013.01); *H04L 47/25* (2013.01)

(58) Field of Classification Search
None
See application file for complete search history.

(56) References Cited

U.S. PATENT DOCUMENTS

| | | | |
|---|---|---|---|
| 6,215,769 B1 | 4/2001 | Ghani et al. | |
| 6,894,974 B1 | 5/2005 | Aweva et al. | |
| 7,486,680 B1 | 2/2009 | Zhang et al. | |
| 2004/0148387 A1 | 7/2004 | Sethi | |
| 2007/0115848 A1 | 5/2007 | Chean et al. | |
| 2007/0223586 A1 | 9/2007 | Nagai et al. | |
| 2008/0008093 A1* | 1/2008 | Wang | H04L 47/10 370/235 |
| 2008/0043688 A1 | 2/2008 | Igarashi et al. | |
| 2008/0049776 A1 | 2/2008 | Wiley et al. | |
| 2008/0259798 A1* | 10/2008 | Loh | H04L 45/302 370/235 |
| 2010/0027464 A1 | 2/2010 | Luo et al. | |
| 2010/0215053 A1 | 8/2010 | Chakareski et al. | |
| 2011/0110253 A1 | 5/2011 | Ahn et al. | |
| 2011/0219287 A1 | 9/2011 | Srinivas et al. | |
| 2011/0228685 A1 | 9/2011 | Higashi et al. | |
| 2011/0310739 A1 | 12/2011 | Aybay | |

(Continued)

*Primary Examiner* — Eunsook Choi
(74) *Attorney, Agent, or Firm* — McDermott Will & Emery LLP

(57) ABSTRACT

The subject technology discloses configurations for receiving, at a first network device, a set of network packets corresponding to a first flow from a client, wherein the set of network packets includes a destination address of a second network device; detecting, in the received set of network packets, pacing rate information indicating a specified pacing rate for transmission of the network packets; determining, based on the detected pacing rate, a desired pacing rate to reduce packet dropping on route to the second network device; and transmitting, by the first network device, the set of network packets over an egress link at the desired pacing rate.

17 Claims, 6 Drawing Sheets

(56) References Cited

U.S. PATENT DOCUMENTS

| | | |
|---|---|---|
| 2012/0149425 A1 | 6/2012 | Choi et al. |
| 2012/0324123 A1 | 12/2012 | Fox et al. |
| 2013/0114594 A1 | 5/2013 | Van Zijst |
| 2015/0016266 A1* | 1/2015 | Dumitrescu .......... H04L 47/623 370/236 |
| 2015/0103660 A1 | 4/2015 | Roskind et al. |

* cited by examiner

PACING ENHANCED PACKET FORWARDING/SWITCHING AND CONGESTION AVOIDANCE

CROSS-REFERENCE TO RELATED APPLICATION

The present application is a continuation of U.S. patent application Ser. No. 14/053,413, entitled "PACING ENHANCED PACKET FORWARDING/SWITCHING AND CONGESTION AVOIDANCE," filed Oct. 14, 2013, the contents of which are hereby incorporated by reference in their entirety for all purposes.

BACKGROUND

The present disclosure generally relates to identifying congestion in a given network. A standard response of packet dropping is often used by protocols, such as TCP/IP, to identify congestion, so that a sender(s) can reduce transmission rates thereby reducing congestion.

SUMMARY

The subject technology provides for a computer-implemented method, the method including: receiving, at a first network device, a set of network packets corresponding to a first flow from a client, wherein the set of network packets includes a destination address of a second network device; detecting, in the received set of network packets, pacing rate information indicating a specified pacing rate for transmission of the network packets; determining, based on the detected pacing rate, a desired pacing rate to reduce packet dropping on route to the second network device; and transmitting, by the first network device, the set of network packets over an egress link at the desired pacing rate.

Yet another aspect of the subject technology provides a system. The system includes one or more processors, and a memory including instructions stored therein, which when executed by the one or more processors, cause the processors to perform operations including: receiving, at a first network device, a set of network packets corresponding to a first flow from a client, wherein the set of network packets includes a destination address of a second network device; detecting, in the received set of network packets, pacing rate information indicating a specified pacing rate for transmission of the network packets; determining, based on the detected pacing rate, a desired pacing rate to reduce packet dropping on route to the second network device; and transmitting, by the first network device, the set of network packets over an egress link at the desired pacing rate.

The subject technology further provides for a non-transitory machine-readable medium comprising instructions stored therein, which when executed by a machine, cause the machine to perform operations including: receiving, at a first network device, a set of network packets corresponding to a first flow from a client, wherein the set of network packets includes a destination address of a second network device; detecting, in the received set of network packets, pacing rate information indicating a specified pacing rate for transmission of the network packets; determining, based on the detected pacing rate, a desired pacing rate to reduce packet dropping on route to the second network device; and transmitting, by the first network device, the set of network packets over an egress link at the desired pacing rate.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

Figure 1:
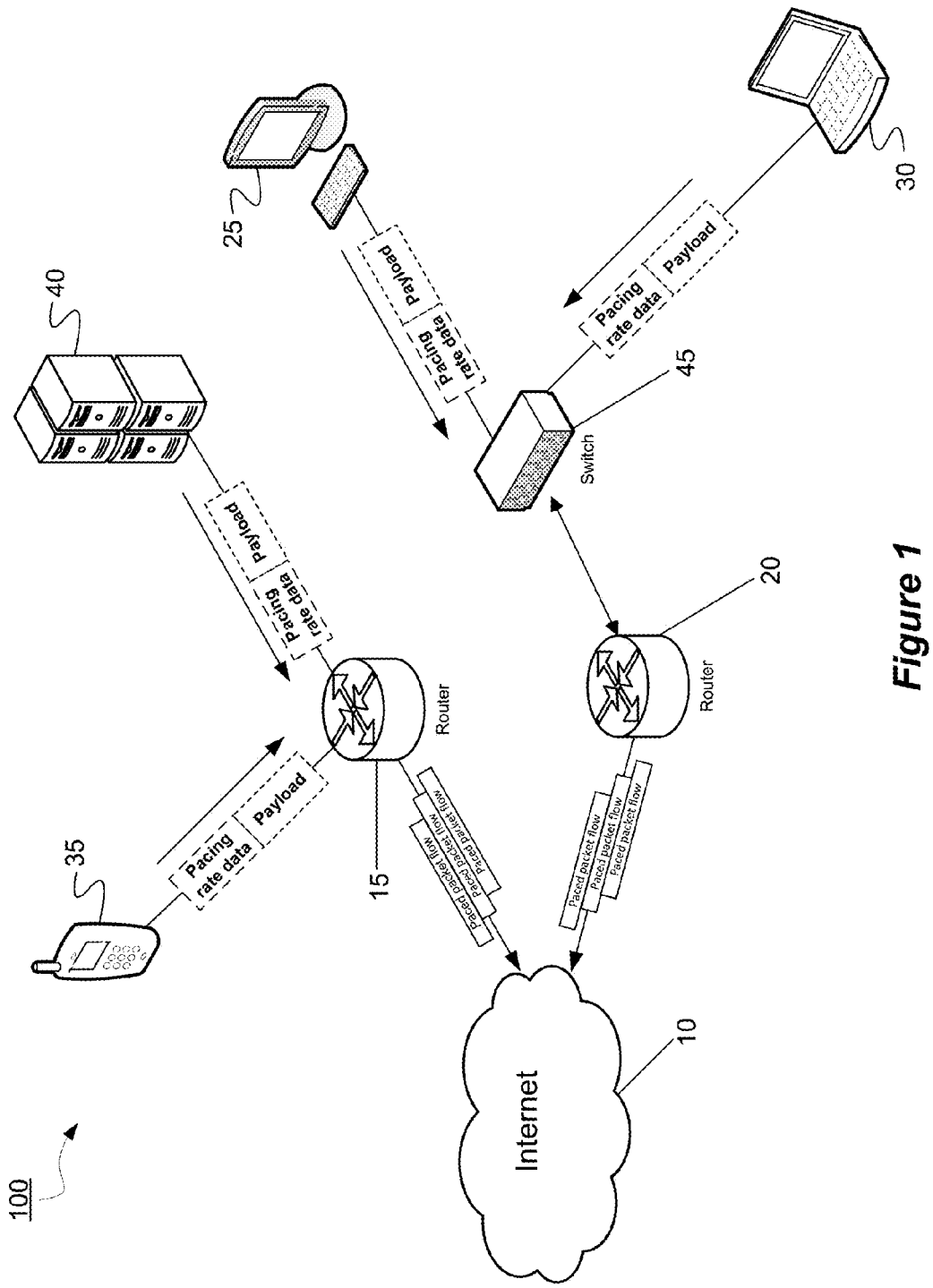
FIG. 1 illustrates an example computing environment including one or more computing devices or systems and network devices according to some configurations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In a data communications network (e.g., an IP packet switching network), packets regularly arrive at a network switching device or forwarding device (e.g., a firewall or cable modem) faster than the egress link (or internal processing speed) of that device can forward the packets. This rate mismatch routinely causes a buffer in such a device to grow until a threshold that requires a packet to be discarded, such as when the available in-device buffer size is exhausted. A standard response of packet dropping is often used by protocols, such as TCP/IP, to identify congestion, so that a sender(s) can reduce transmission rates thereby reducing congestion.

Pacing of packet transmission (e.g., temporally spacing packet transmissions to match estimations of bandwidth) by a sender may reduce such congestion-based losses, but some network elements may hamper efforts to pace packet transmission. For example, some transmission elements, such as a Wi-Fi link on a device, may buffer and transmit a series of paced packets in a single large block. Similarly, due to a delay in starting a mobile radio of a given mobile device, a large group of packets may be buffered and transmitted together (e.g., with minimal or no interpacket spacing) despite a desire to pace the transmission from the mobile device.

Thus, it would be desirable for switching or forwarding devices to re-establish the pacing rate on packets, even after a device (such as the above Wi-Fi device) has gathered packets for transmission together. Further, it would be desirable for a middle network element, such as an internet switch or router, to better select which packets to discard in a congested scenario.

In some implementations, a sender of data packets, such as a client, may include in a data packet a desired pacing rate at which the packets are currently sent. In some implementations, a pacing rate may be specified by a planned timed delay between sending packets. For example, in a packet streaming protocol such as TCP/IP, or QUIC (which runs over UDP), a subset of the packets may include a publicly visible field that indicates a planned pacing rate. In some implementations, a pacing rate may be included in a packet when the pacing rate changes for a packet flow. Further, in some implementations, a pacing rate may be included in a packet periodically, such as after a number of packets have been transmitted, or after a period of time since the last packet was transmitted with the rate.

A middle network element may obtain a desired pacing rate for a flow (e.g., connection or stream) in one example. Examples of middle network elements include network devices such as a packet network switch, a router, a firewall, a cable modem, etc. In some implementations, a desired pacing rate may be obtained by examining packets, and recording an embedded planned pacing rate that may be embedded (periodically or otherwise) in a packet by a sender.

In some implementations, a desired pacing rate may be obtained from a stream of packets that does not explicitly state its pacing rate by estimating the inflow rate of packets in the stream. A desired pacing rate may be deduced when not explicitly stated in a flow by examining packet forwarding rates (e.g., arrival rates at the middle network element), and examining corresponding responsive acknowledgment rates (e.g., from receiving ACK packets from a recipient), and estimating what pacing rate could be used without incurring packet loss. However, for a given flow that does not explicitly include a planned pacing rate in its packets, the subject technology may penalize the transmission of such packets by applying a lower pacing rate for that flow than for another flow that explicitly includes a planned pacing rate in its packets.

In some implementations, a desired pacing rate may be determined for individual flows, such as a single TCP/IP connection flow, or a QUIC flow. In one example, a middle network element may aggregate, based on one or more criteria, a plurality of flows into one or more aggregated flows for transmission. In this example, a pacing rate may be determined for such aggregated flows, such as a respective aggregated flow including all flows from a given source address, or a respective aggregated flow including all flows to a given destination address, or a respective aggregated flow including all flows that will exit the middle network element on a specific link or group of links. Other ways to aggregate flows may be provided and still be within the scope of the subject technology.

In some implementations, a middle network element may determine a maximum pacing rate for a flow, or an aggregate flow. For example, a middle network element may determine its maximum aggregate egress flow by limiting it to a hardware restriction on an egress link of the middle network element. An example of an egress link may include a specified output port(s) (e.g., virtual or physical) of the middle network element. In another example, a middle network element may determine the limit on combined flow toward a group of destinations, such as to a single IP address, by noting that traffic rates above a certain bandwidth routinely result in acknowledged packet loss (e.g., from not receiving ACK packets from a recipient). A desired pacing rate may be a rate below the maximum pacing rate in some examples.

In some implementations, a middle network element may determine that congestion is present on network traffic passing through the middle network element. For example, the middle network element may determine that its buffer of packets does not have available space to buffer an additional incoming packet. In another example, congestion may be indicated after the middle network element determines that its buffer of packets has increased above a threshold size, or is increasing towards a threshold at a rate above a second threshold (e.g., that indicates an unsustainable rate for buffering packets). In a further example, the middle network element may determine that the aggregated desired pacing rates on a plurality of flows exceed the egress link rate (e.g., a limitation of the egress link such as a hardware limitation), and then indicate that congestion has occurred.

In some implementations, a middle network element that detects congestion may discard (e.g., drop) one or more packets with a preference to discard packets in a flow(s) that has a larger desired pacing rate in comparison with one or more other flows. For example, if only one packet needs to be discarded, the packet to discard might be selected from a flow which has the highest desired pacing rate. In another example, the packet to discard may be selected probabilistically with a bias toward discarding packets in flows with larger desired pacing rates. In some implementations, a selection of a packet to discard may favor discarding packets that do not contain explicit pacing rates (and hence only had deduced desired pacing rates), over other flows that explicitly contain desired pacing rates embedded in packets.

In examples in which packet flows routinely include a "planned pacing rate", then a middle network element may "fairly" drop packets on any flow that asserts that the flow is sending at a rate that is deemed too high to avoid congestion and/or packet drops. If an endpoint or client provides misinformation indicating a false low rate (e.g., where packets include a false planned pacing rate that is lower than an actual pacing rate) then packets from the endpoint or client may be delayed to support that lower pacing rate. As a result, there is less motivation by clients to provide such misinformation. Thus, it is possible for a middle network element to better trust provided pacing rate information, and hence more fairly perform congestion resolution (e.g., drop packets).

FIG. 1 illustrates an example computing environment including one or more computing devices or systems and network devices according to some configurations of the subject technology. More specifically, the computing environment 100 includes a computing system 40 and computing devices 35, 25, and 30. Further, network devices 15, 20 and 45 are also illustrated in the example of FIG. 1 that are communicatively coupled to a network 10 (e.g., the Internet). Each of the computing devices and/or computing systems may transmit packets of data (including pacing rate data described above) that are transmitted through the network 10.

Figure 2:
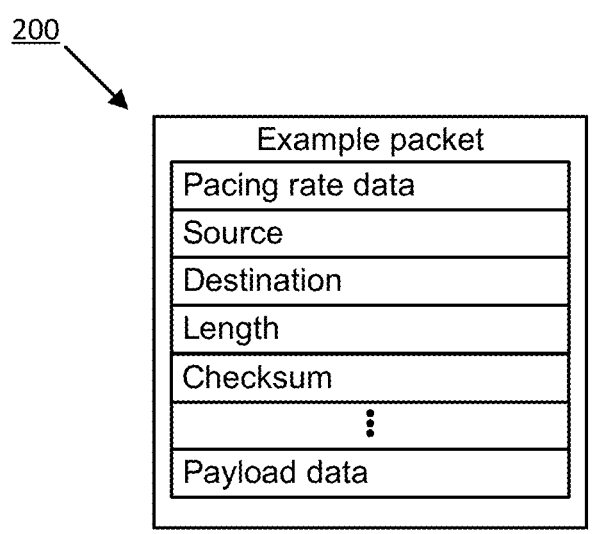
FIG. 2 conceptually illustrates an example packet of data including pacing rate data according to some configurations of the subject technology.

FIG. 2 conceptually illustrates an example packet 200 of data including pacing rate data according to some configurations of the subject technology. As illustrated, the packet 200 includes data corresponding to pacing rate data, source, destination, length, checksum and payload data. Other types of data may be included in the packet 200 and still be within the scope of the subject technology. Further, although the example in FIG. 2 illustrates one arrangement of the data, it should be appreciated that other arrangements of the data may be provided and still be within the scope of the subject technology. It should also be appreciated that it is not necessary that each of the types of data illustrated in FIG. 2 be included in the packet 200 in some configurations.

Figure 3:
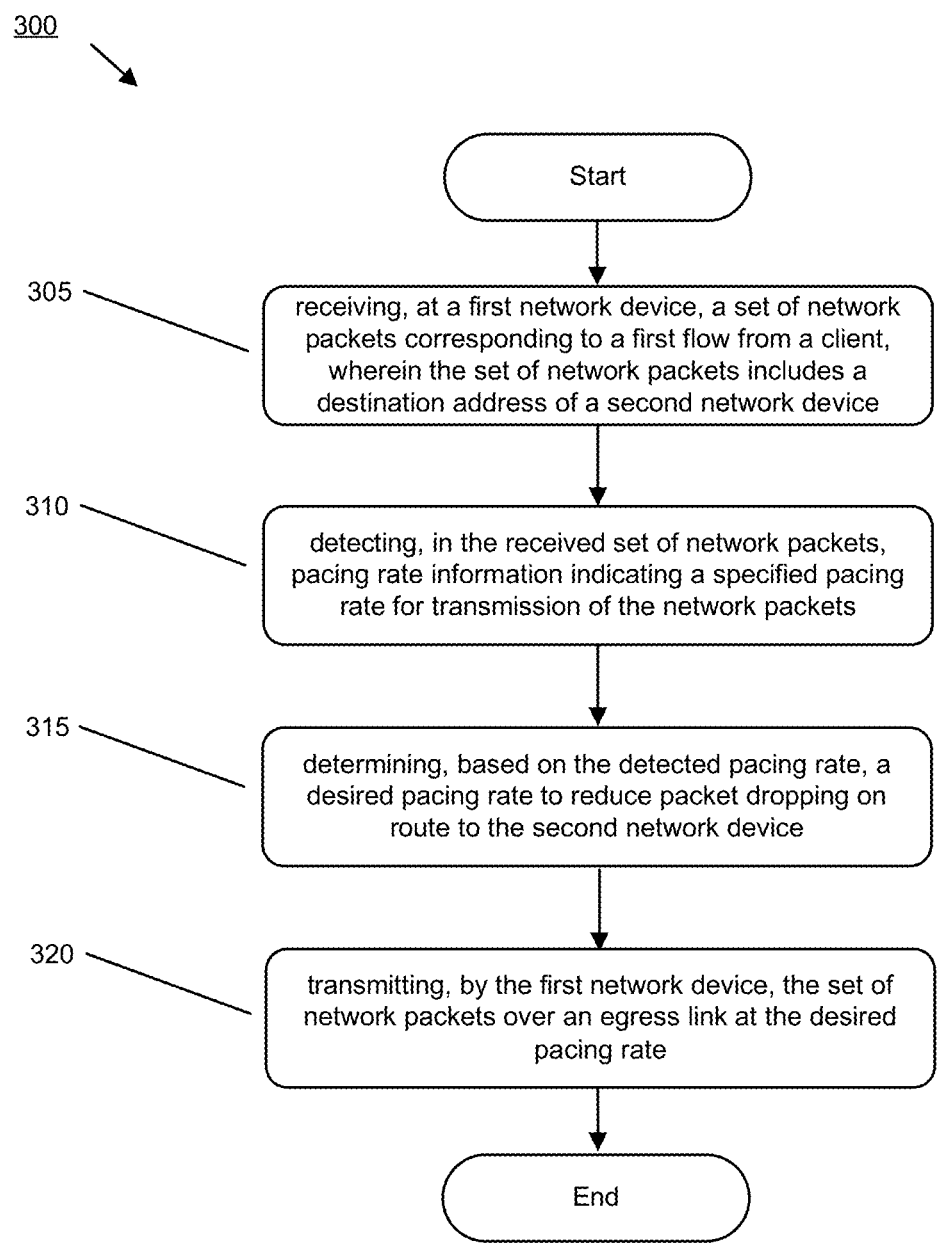
FIG. 3 conceptually illustrates an example process for transmitting a set of packets at a desired pacing rate according to some configurations of the subject technology.

FIG. 3 conceptually illustrates an example process 300 for transmitting a set of packets at a desired pacing rate according to some configurations of the subject technology. The process in FIG. 3 may be performed by one or more computing devices or systems in some configurations.

The process 300 begins at 305 by receiving, at a first network device, a set of network packets corresponding to a first flow from a client, wherein the set of network packets includes a destination address of a second network device. In one example, the first network device may be a packet network switch, router, firewall, or cable modem.

The process 300 at 310 detects, in the received set of network packets, pacing rate information indicating a specified pacing rate for transmission of the network packets.

The process 300 at 315 determines, based on the detected pacing rate, a desired pacing rate to reduce packet dropping on route to the second network device. In one example, the desired pacing rate is determined based on one or more criteria. The one or more criteria comprises a hardware limitation indicating a maximum rate of the egress link or a threshold egress rate.

The process 300 at 320 transmits, by the first network device, the set of network packets over an egress link at the desired pacing rate. In one example, the desired pacing rate is lower than the maximum rate of the egress link. In one example, the desired pacing rate is lower than the threshold egress rate. The threshold egress rate may be a rate indicating an occurrence of packet loss above the threshold egress rate. The process 300 then ends.

Figure 4:
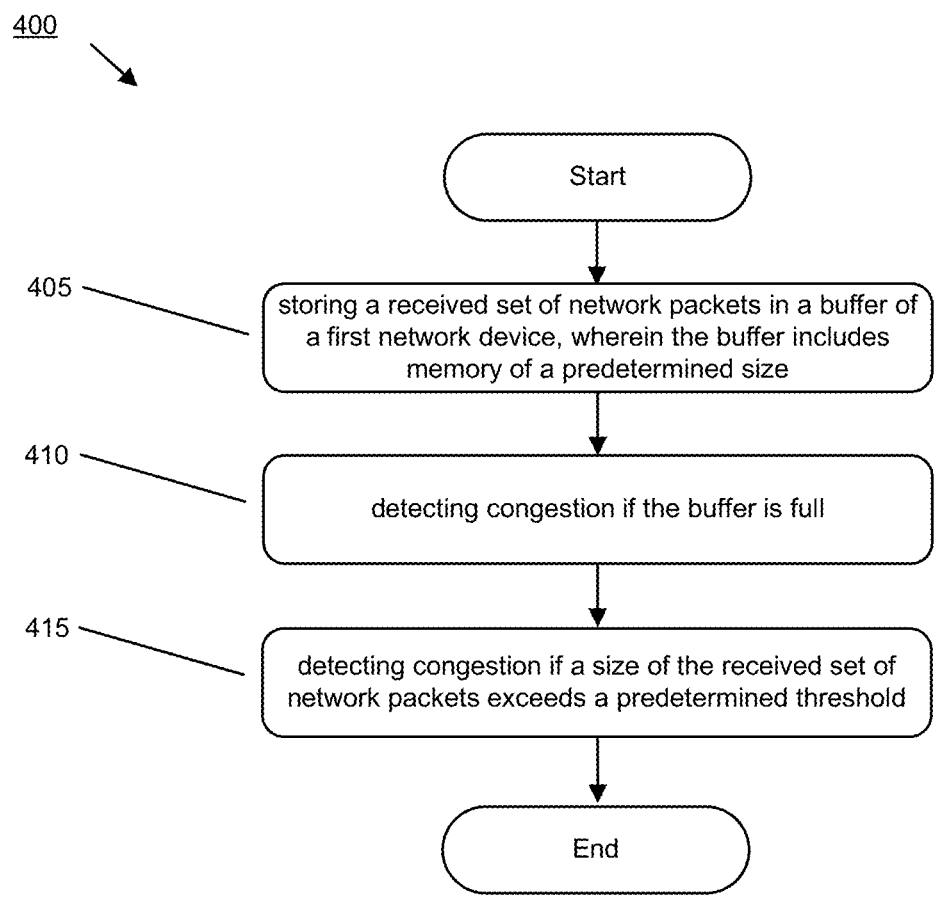
FIG. 4 conceptually illustrates an example process for detecting congestion in a network according to some configurations of the subject technology.

FIG. 4 conceptually illustrates an example process 400 for detecting congestion in a network according to some configurations of the subject technology. The process in FIG. 4 may be performed by one or more computing devices or systems in some configurations. In one example, the process 400 may be performed conjunctively with the process 300 described in FIG. 3.

The process 400 begins at 405 by storing a received set of network packets in a buffer of a first network device, wherein the buffer includes memory of a predetermined size.

The process 400 at 410 detects congestion if the buffer is full.

The process 400 at 415 detects congestion if a size of the received set of network packets exceeds a predetermined threshold. The process 400 then ends.

Figure 5:
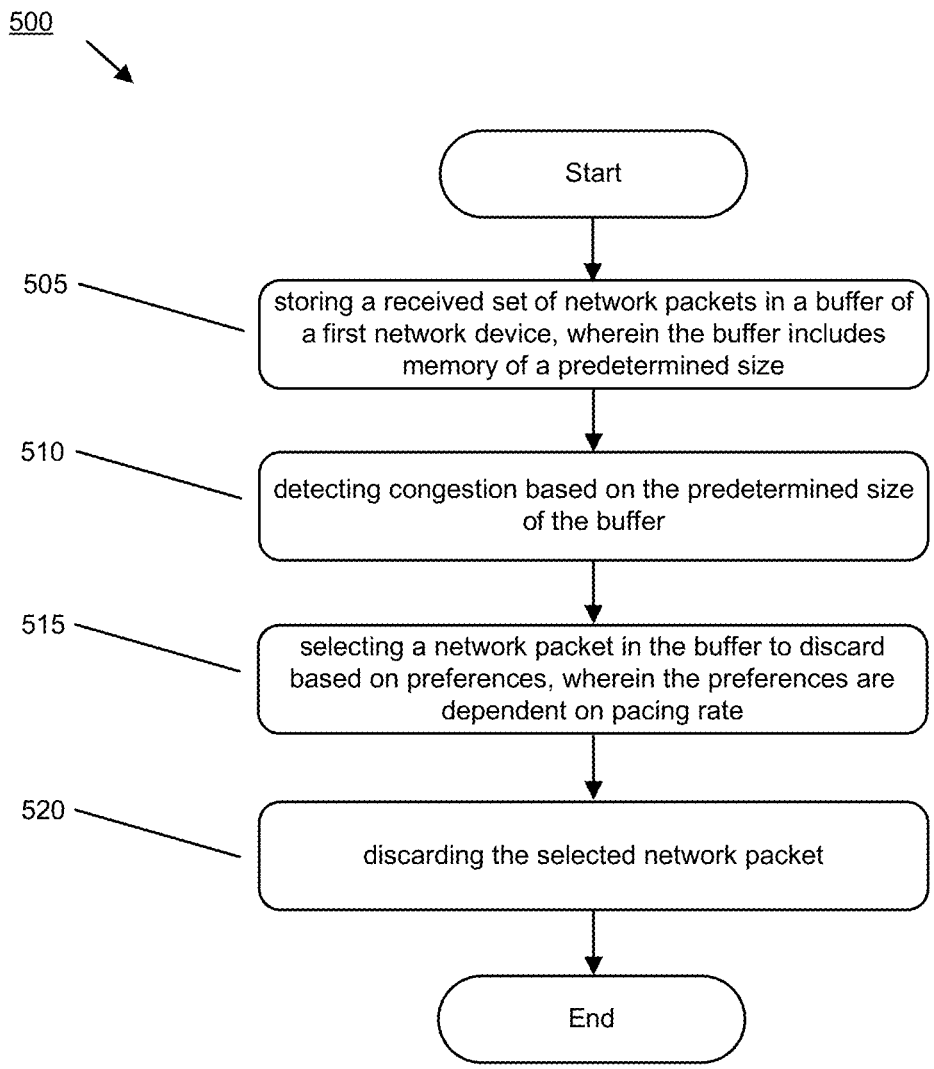
FIG. 5 conceptually illustrates an example process for discarding a packet according to some configurations of the subject technology.

FIG. 5 conceptually illustrates an example process 500 for discarding a packet according to some configurations of the subject technology. The process in FIG. 5 may be performed by one or more computing devices or systems in some configurations. In one example, the process 500 may be performed conjunctively with the process 300 described in FIG. 3 and/or the process 400 described in FIG. 4.

The process 500 begins at 505 by storing a received set of network packets in a buffer of a first network device, wherein the buffer includes memory of a predetermined size.

The process 500 at 510 detects congestion based on the predetermined size of the buffer. In one example, congestion can be detected if the buffer does not have available space to buffer an additional incoming packet (e.g., the buffer is full). In another example, congestion may be detected if number of packets in the buffer has increased above a threshold size, or is increasing towards a threshold at a rate above a second threshold (e.g., that indicates an unsustainable rate for buffering packets).

The process 500 at 515 selects a network packet that is stored in the buffer to discard based on preferences, wherein the preferences are dependent on pacing rate. In some implementations, a preference is to discard one or more packets in a flow(s) that has a larger desired pacing rate in comparison with one or more other flows. In one example, the packet to discard might be selected from a flow which has the highest desired pacing rate. In another example, the packet to discard may be selected probabilistically with a bias toward discarding packets in flows with larger desired pacing rates. In some implementations, a selection of a packet to discard may favor discarding packets that do not contain explicit pacing rates (and hence only had deduced desired pacing rates), over other flows that explicitly contain desired pacing rates embedded in packets.

The process 500 at 520 discards the selected network packet. The process 500 then ends.

The following description describes an example system in which aspects of the subject technology can be implemented.

Figure 6:
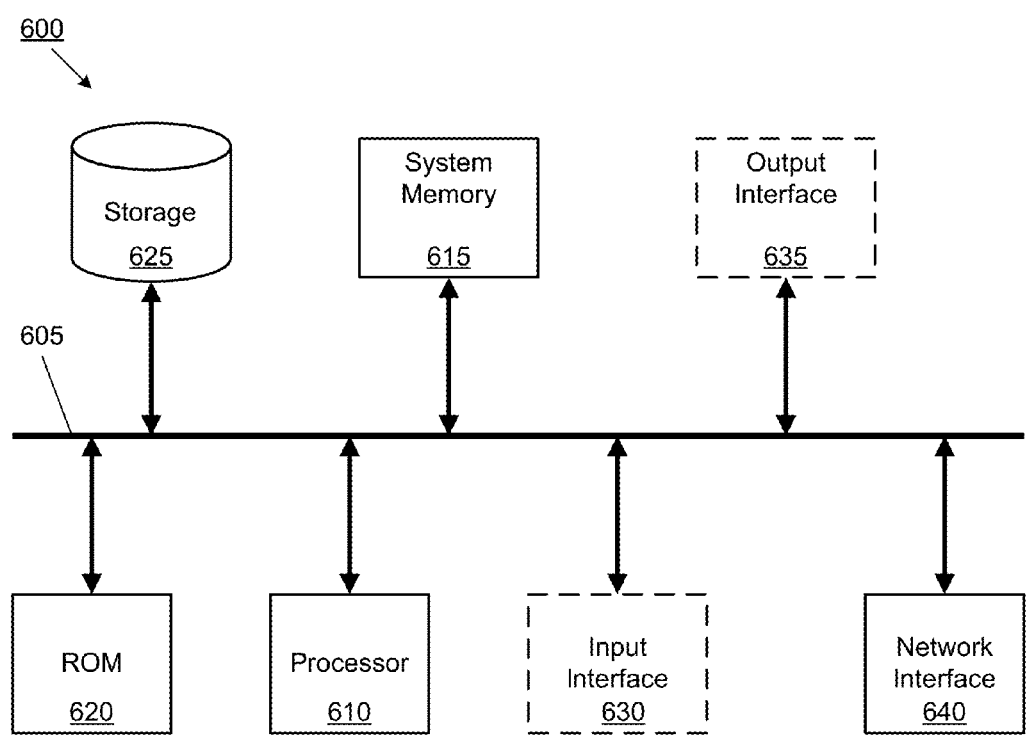
FIG. 6 conceptually illustrates an example of an electronic system with which some configurations of the subject technology can be implemented.

FIG. 6 conceptually illustrates a system 600 with which some implementations of the subject technology can be implemented. The system 600 can be a computer, phone, PDA, or another sort of electronic device. Such a system includes various types of computer readable media and interfaces for various other types of computer readable media. The system 600 includes a bus 605, processing unit(s) 610, a system memory 615, a read-only memory 620, a storage device 625, an optional input interface 630, an optional output interface 635, and a network interface 640.

The bus 605 collectively represents all system, peripheral, and chipset buses that communicatively connect the numerous internal devices of the system 600. For instance, the bus 605 communicatively connects the processing unit(s) 610 with the read-only-memory (ROM) 620, the system memory 615, and the storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the system 600. The storage device 625, on the other hand, is a read-and-write memory device. This device is a non-volatile memory unit that stores instructions and data even when the system 600 is off. Some implementations of the subject technology use a mass-storage device (such as a magnetic or optical disk and its corresponding disk drive) as the storage device 625.

Other implementations use a removable storage device (such as a flash drive, a floppy disk, and its corresponding disk drive) as the storage device 625. Like the storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the subject technology's processes are stored in the system memory 615, the storage device 625, and/or the read-only memory 620. For example, the various memory units include instructions for processing multimedia items in accordance with some implementations. From these various memory units, the processing unit(s) 610 retrieves instructions to execute and data to process in order to execute the processes of some implementations.

The bus 605 also connects to the optional input and output interfaces 630 and 635. The optional input interface 630 enables the user to communicate information and select commands to the system. The optional input interface 630 can interface with alphanumeric keyboards and pointing devices (also called "cursor control devices"). The optional output interface 635 can provide display images generated by the system 600. The optional output interface 635 can interface with printers and display devices, such as cathode ray tubes (CRT) or liquid crystal displays (LCD). Some implementations can interface with devices such as a touchscreen that functions as both input and output devices.

Finally, as shown in FIG. 6, bus 605 also couples system 600 to a network interface 640 through a network adapter (not shown). In this manner, the computer can be a part of a network of computers (such as a local area network ("LAN"), a wide area network ("WAN"), or an Intranet, or an interconnected network of networks, such as the Internet. The components of system 600 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method, the method comprising:
    detecting congestion of network packets received from one or more clients in a buffer of a first network device;
    identifying a plurality of flows associated with the network packets in the buffer, each of the plurality of flows being associated with a respective pacing rate identifying a rate to space transmissions of the network packets to a second network device;
    comparing the respective pacing rates associated with the plurality of flows to one another;
    selecting a flow from the plurality of flows based on the associated pacing rates, wherein selecting the flow from the plurality of flows is based on the comparing; and
    discarding, in response to the detected congestion, at least one network packet associated with the selected flow from the buffer.

2. The method of claim 1, wherein the pacing rate associated with the selected flow is larger than the pacing rate associated with at least another one of plurality of flows.

3. The method of claim 2, wherein the pacing rate associated with the selected flow is the largest pacing rate associated with the plurality of flows.

4. The method of claim 1, further comprising:
    determining the respective pacing rates associated with the plurality of flows,
    wherein the respective pacing rate associated with each of the plurality of flows is determined based on pacing rate information indicated in one or more of the network packets associated with the respective flow or based on an estimated pacing rate associated with the respective flow.

5. The method of claim 4, wherein selecting the flow from the plurality of flows is based on whether the associated pacing rate is based on indicated pacing rate information or based on an estimated pacing rate.

6. The method of claim 5, wherein the respective pacing rate of the selected flow is based on an estimated pacing rate.

7. The method of claim 4, further comprising:
    determining a forwarding rate based on an arrival time of one or more network packets at the first network device,
    wherein the estimated pacing rate is deduced based on the forwarding rate.

8. The method of claim 4, further comprising:
    determining an acknowledgment rate based on an arrival rate of acknowledgment packets from the second network device,
    wherein the estimated pacing rate is deduced based on the acknowledgment rate.

9. A system, comprising:
    one or more processors; and
    a memory comprising instructions stored therein, which when executed by the one or more processors, cause the processors to perform operations comprising:
        storing network packets received from one or more clients in a buffer of a first network device;
        detecting congestion of network packets in the buffer;
        identifying a plurality of flows associated with the network packets in the buffer, each of the plurality of flows being associated with a respective pacing rate identifying a rate to space transmissions of the network packets to a second network device;
        comparing the respective pacing rates associated with the plurality of flows to one another;
        selecting a flow from the plurality of flows based on the associated pacing rates, wherein selecting the flow from the plurality of flows is based on the comparing, and the pacing rate associated with the selected flow is larger than the pacing rate associated with at least another one of plurality of flows; and
        discarding, in response to the detected congestion, at least one network packet associated with the selected flow from the buffer.

10. The system of claim 9, wherein the pacing rate associated with the selected flow is the largest pacing rate associated with the plurality of flows.

11. The system of claim 9, wherein the operations further comprise:
    determining the respective pacing rates associated with the plurality of flows,
    wherein the respective pacing rate associated with each of the plurality of flows is determined based on pacing rate information indicated in one or more of the network packets associated with the respective flow or based on an estimated pacing rate associated with the respective flow.

12. The system of claim 11, wherein selecting the flow from the plurality of flows is based on whether the associated pacing rate is based on the indicated pacing rate information or based on the estimated pacing rate.

13. The system of claim 12, wherein the respective pacing rate of the selected flow is based on the estimated pacing rate.

14. The system of claim 11, wherein the operations further comprise:
   determining a forwarding rate based on an arrival time of one or more network packets at the first network device,
   wherein the estimated pacing rate is deduced based on the forwarding rate.

15. The system of claim 11, wherein the operations further comprise:
   determining an acknowledgment rate based on an arrival rate of acknowledgment packets from the second network device,
   wherein the estimated pacing rate is deduced based on the acknowledgment rate.

16. A non-transitory machine-readable medium comprising instructions stored therein, which when executed by a machine, cause the machine to perform operations comprising:
   receiving, at a first network device, network packets corresponding to a plurality of flows from one or more clients, each of the plurality of flows being associated with a respective pacing rate identifying a rate to space transmissions of the network packets to a second network device;
   storing the network packets in a buffer of the first network device;
   detecting congestion of network packets in the buffer;
   determining a forwarding rate based on an arrival time of one or more network packets at the first network device;
   determining the respective pacing rates associated with the plurality of flows, wherein the respective pacing rate associated with each of the plurality of flows is determined based on pacing rate information indicated in one or more of the network packets associated with the respective flow or based on an estimated pacing rate associated with the respective flow, and wherein the estimated pacing rate is deduced based on the forwarding rate;
   selecting, in response to the detected congestion, a flow from the plurality of flows based on the associated pacing rate, wherein selecting the flow from the plurality of flows is based on whether the associated pacing rate is based on the indicated pacing rate information or based on the estimated pacing rate, and the respective pacing rate of the selected flow is based on the estimated pacing rate; and
   discarding, in response to the detected congestion, at least one network packet associated with the selected flow from the buffer.

17. The non-transitory machine-readable medium of claim 16, wherein the respective pacing rate of the selected flow is based on the estimated pacing rate, further comprising:
   determining an acknowledgment rate based on an arrival rate of acknowledgment packets from the second network device,
   wherein the estimated pacing rate is deduced based on the acknowledgment rate.

* * * * *